United States Patent [19]

Scraggs et al.

[11] 4,383,344
[45] May 17, 1983

[54] VEHICLE REAR SURFACE WASHING SYSTEM

[76] Inventors: Charles R. Scraggs, 3348 Flowers Dr., College Park, Ga. 30337; Paul E. Northcutt, 4984 Crowe Dr., Smyrna, Ga. 30080

[21] Appl. No.: 261,481

[22] Filed: May 7, 1981

[51] Int. Cl.³ ............................................. B60S 3/06
[52] U.S. Cl. .............................. 15/53 A; 15/53 AB; 15/DIG. 2
[58] Field of Search ............ 15/53 A, 53 AB, DIG. 2; 134/6, 45, 123

[56] References Cited

U.S. PATENT DOCUMENTS

| | | | |
|---|---|---|---|
| 2,610,342 | 9/1952 | Griffiths | 15/53 AB |
| 2,627,080 | 2/1953 | Holmes | |
| 3,060,473 | 10/1962 | Vani | |
| 3,332,098 | 7/1967 | Smith | 15/53 AB |
| 3,425,080 | 2/1969 | Dolitzsch et al. | 15/53 A |
| 3,438,077 | 4/1969 | Eubanks | 15/53 A |
| 3,495,287 | 2/1970 | Freimanis | |
| 3,795,929 | 3/1974 | Thompson | |

*Primary Examiner*—Edward L. Roberts
*Attorney, Agent, or Firm*—Jones & Askew

[57] ABSTRACT

A vehicle rear vertical surface washing system comprising a horizontally movable carriage positionable within a frame adjacent the rear vertical surface of a vehicle and a vertically movable carriage which carries a rotary brush that washes and sweeps the rear vertical surface of the vehicle. Limit switches provide control signals to sequential logic implemented by relays and initiate the forward motion of the horizontal carriage toward the rear vertical surface of the vehicle at an appropriate point in the washing cycle. The light beam of an electric eye is broken when the carriage has moved adjacent the vertical surface, and provides a signal to halt the forward motion of the carriage. The rotary brush assembly mounted on the vertical carriage then travels downwardly washing and sweeping the vertical surface, and then reverses its direction and travels upwardly while rinsing and sweeping the vertical surface. The apparatus thus is independent of the length of the vehicle and the position of the vehicle within the frame, provided that the rear vertical surface has stopped within the limits of movement of the horizontal carriage.

14 Claims, 6 Drawing Figures

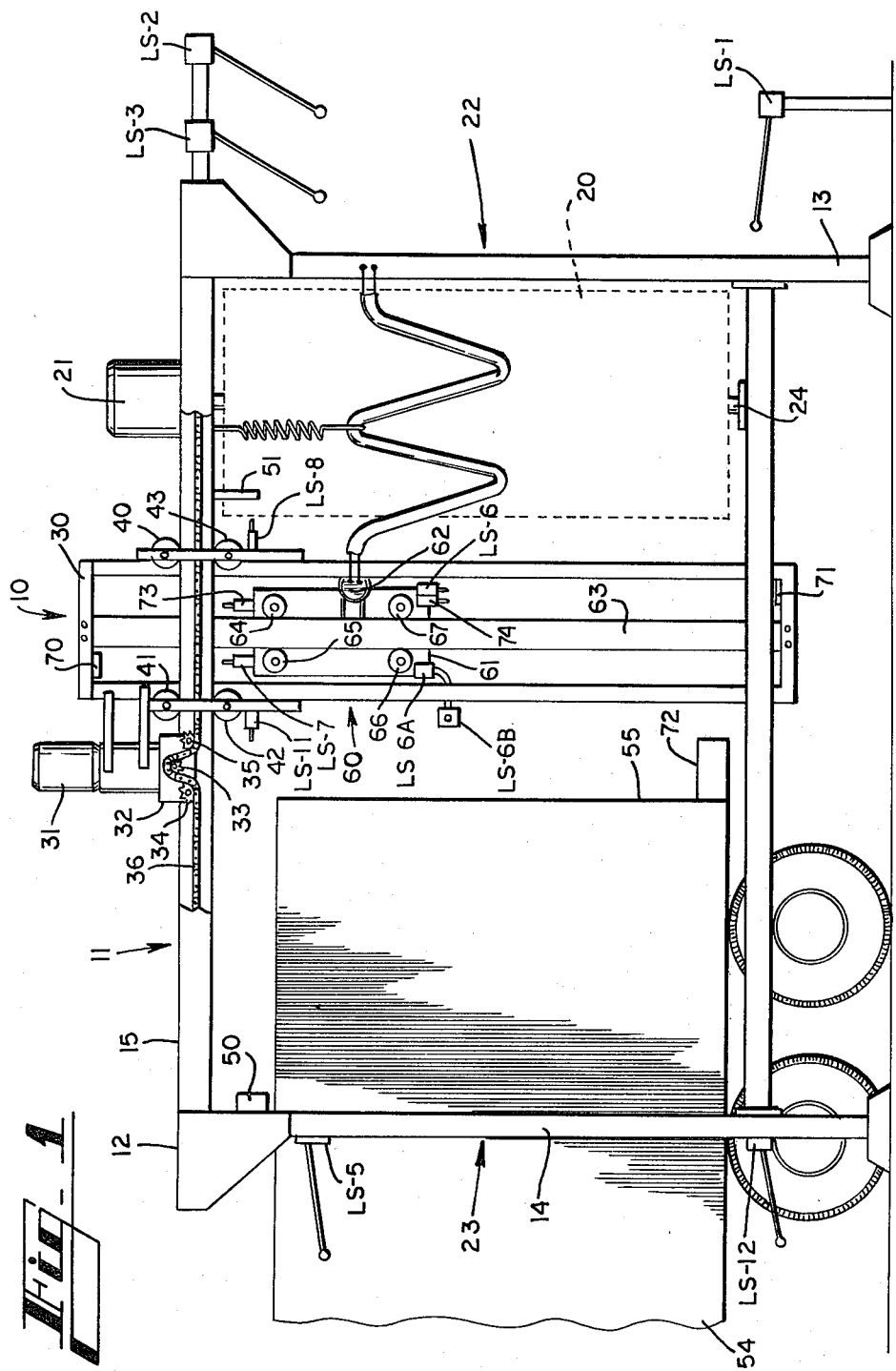

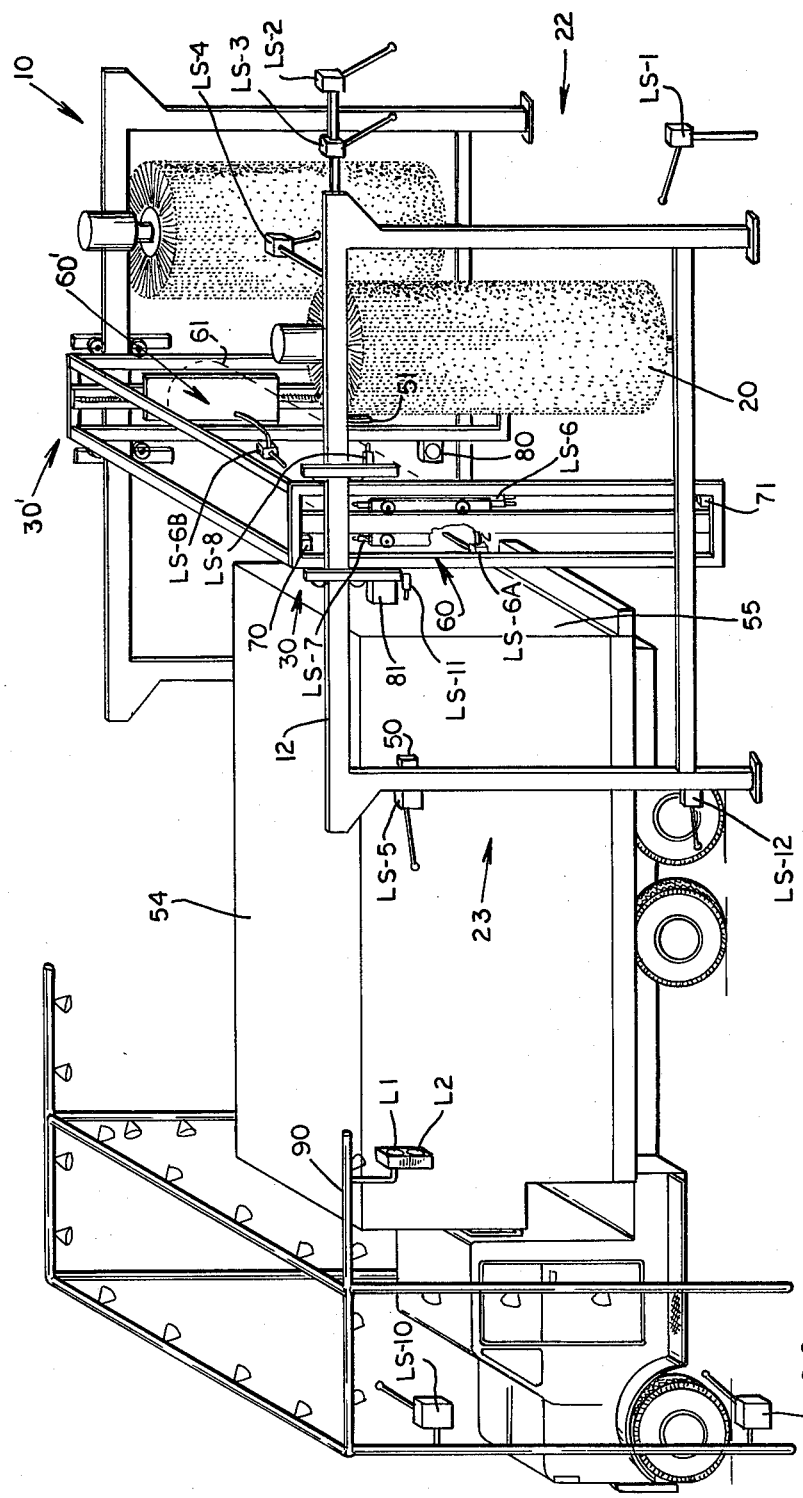

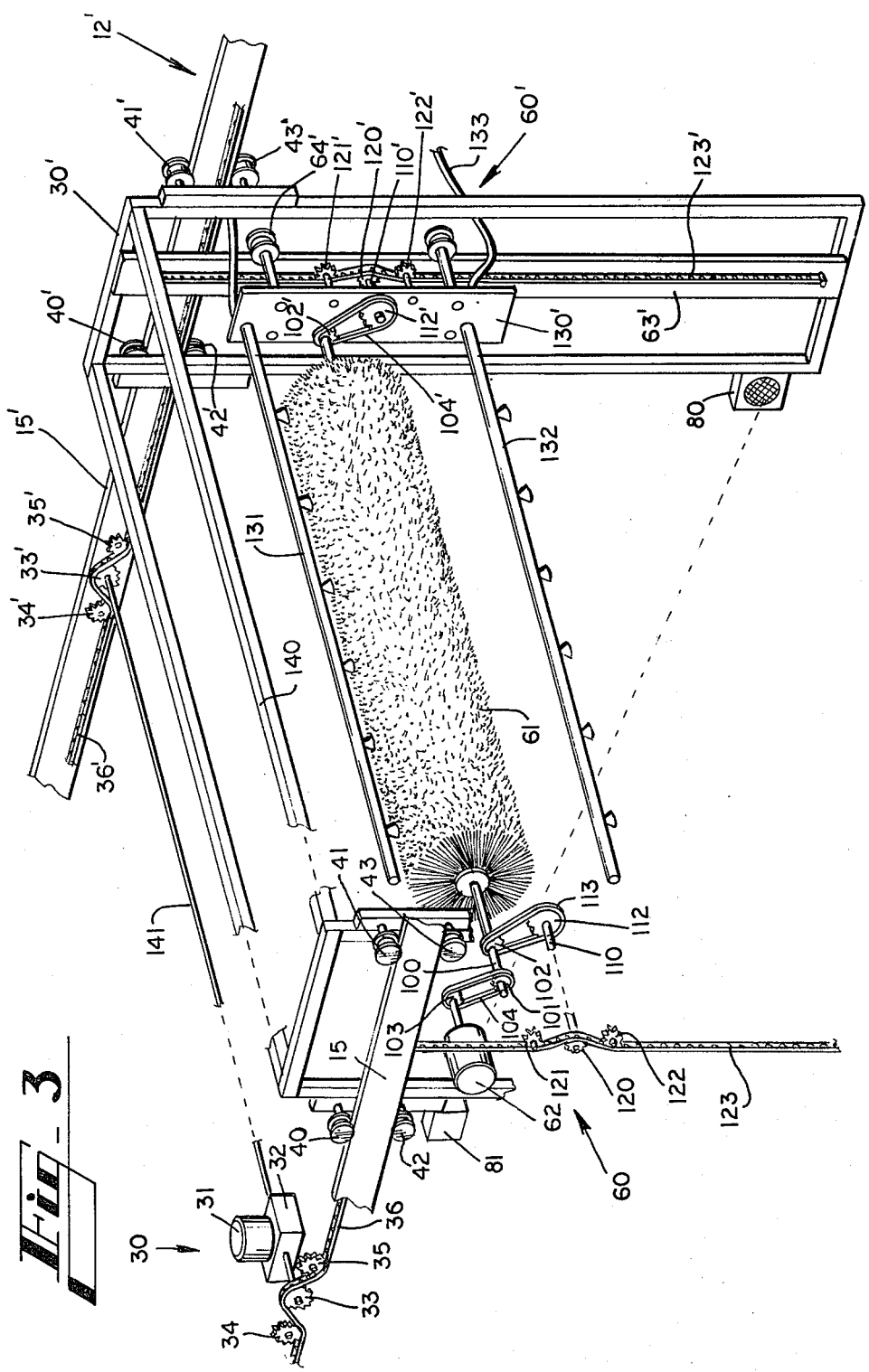

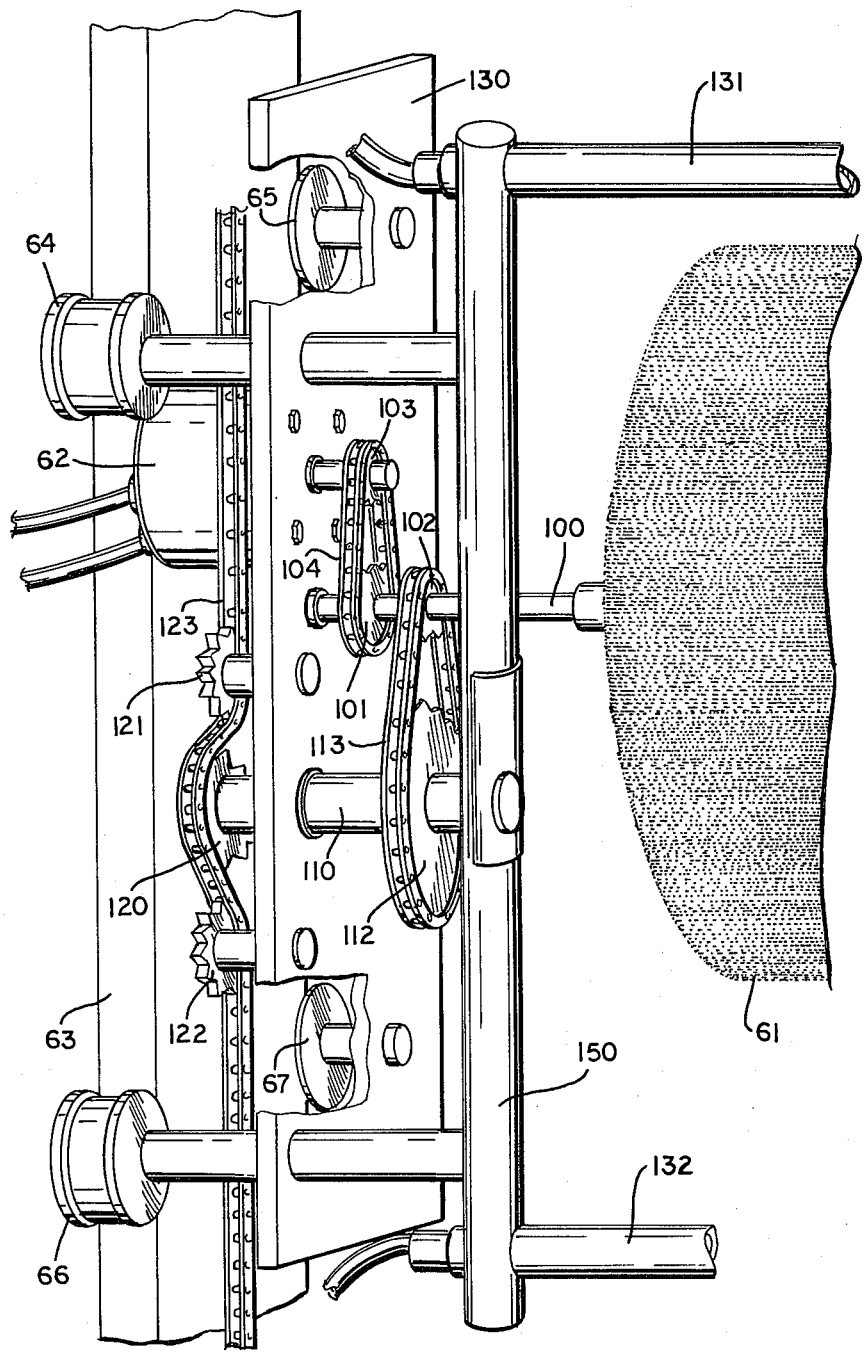
Fig_4

VEHICLE REAR SURFACE WASHING SYSTEM

BACKGROUND

1. Field of the Invention

This invention relates in general to vehicle washing systems, and specifically relates to a vehicle rear surface washing system, comprising an apparatus for washing the vertical rear door of trucks, trailers, buses and vans.

2. Description of the Prior Art

Automated vehicle systems have been developed for cleaning large vehicles such as the vertical sides of the trailers of semi-trailers towed by tractors, whereby the driver pulls a trailer into the system until the side and rear surface of the trailer are located at a predetermined position, and the system is energized to begin the washing procedure. The vehicle washers usually are constructed with brushes for cleaning and sweeping the sides of a vehicle and one or more brushes adapted to sweep the rear of the vehicle as it passes through the washing system. Some of the vehicles have recessed, vertically movable rear doors while others have hinged doors that swing about vertical axes. Sometimes, a vehicle will have a step or loading ledge which protrudes outwardly beneath the rear door. The different configurations of the rear surfaces of the vehicles cause some of the cleaning systems to be ineffective since the brushes do not make proper contact with the surfaces that require cleaning. One conventional approach to rear door cleaning is to provide a signal to the driver to halt his vehicle at a predetermined point in the washing system so as to allow a vertically-disposed rotary brush to descend and sweep the rear door. In some instances drivers cannot stop their vehicles precisely when signalled and must either back up the vehicle to the predetermined point or have the rear door washed with insufficient brush contact to provide adequate cleaning.

Another approach to cleaning the rear surface of a vehicle is described in Griffiths, U.S. Pat. No. 2,610,342, where a rotary brush is horizontally mounted upon a pivoted, swinging mechanism, which is then mounted to a vertically moving carriage. When the vehicle has stopped within a predetermined range beyond the brush mechanism, the rotary brush frame pivots and swings outwardly from the vertical carriage and brushes the rear surface, held against the rear door by either a counterweighting action of the opposite end of the brush frame or by the torque of a motor which is used to pivot the rotary brush frame outwardly. The driver must stop the rear of the vehicle a short distance beyond the vertical carriage mechanism, so that the rear surface is not beyond the reach of the rotary brush when it is pivoted outwardly. With semi tractor-trailer vehicles, the problem is magnified due to the immense sizes and loaded weight of the trailers involved, so that it is difficult for a driver to position the rear end of the vehicle within the narrow range required by the washing apparatus. Moreover, the problem is complicated when the washing apparatus must handle vehicles of different lengths because any signal to a driver of a vehicle of a given length will not necessarily give a proper stop indication to a driver having a vehicle of a different length.

Another method for cleaning the rear surface of a vehicle is to employ vertical rotary brushes mounted at the end of vertically pivoting arms of fixed length to brush both the sides and rear of the vehicle. After the sides have been brushed, and as the rear of the vehicle passes by the brushes, the brushes and arms pivot and swing outwardly towards the rear surface and brush the rear surface. Because the brush is mounted on an arm of fixed length, the brush bristles cannot be maintained tangential to the rear surface as the arm pivots, and thus the velocity of the bristles changes as the brush moves across the rear surface. Consequently, this approach often results in uneven cleaning of the rear surface because of the changing velocity of the brush bristles at the point of contact with the rear surface.

Still another approach to cleaning vertical rear surfaces has been to employ a movable carriage which supports a horizontally-disposed brush for scrubbing the top and certain rear portions of a vehicle. In Thompson, U.S. Pat. No. 3,795,929, a carriage moves from the front to the rear of the vehicle as the horizontal brush scrubs the top; when the brush falls from the top of the vehicle, it actuates a control member which halts the carriage motion as the top brush cleans the rear window of upper rear vertical surface of the vehicle. However, this approach does not allow the cleaning of the entire vertical rear surface.

SUMMARY OF THE INVENTION

Briefly described, the present invention comprises a vehicle rear vertical surface washing system which includes a rotary brush movable towards and away from the rear vertical surface of a vehicle, control circuitry for controlling the movement of the brush and the washing and rinsing functions, and motors for moving the brush towards the rear vertical surface and brushing the surface as it is being sprayed with detergent and rinses.

More particularly described, the preferred embodiment of the present invention comprises a vehicle rear door washing system which includes a frame from which is suspended a movable horizontal carriage that is horizontally positionable adjacent the rear surface of the vehicle which is to be cleaned. When the rear vertical surface or door of a trailer or van passes a sensing device located on the horizontal carriage, a control signal is provided which initiates the motion of the horizontal carriage and gives the driver an indication to stop the vehicle. The horizontal carriage then moves within the frame toward the rear vertical surface to be washed. The sensing device, an infrared electric eye in the preferred embodiment, also provides a control signal when the horizontal carriage has moved in the frame adjacent the rear vertical surface of the vehicle.

Affixed to the horizontal carriage is a separate vertically movable vertical carriage which includes a rotary brush adapted to sweep the rear vertical surface of the vehicle. When the horizontal carriage has come to rest adjacent the vertical surface, the vertical carriage and rotary brush move downwardly, cleaning and sweeping the rear vertical surface. As the brush descends, it rotates in a direction which insures that the bristles have maximum frictional contact rather than slippage against the surface being cleaned. When the vertical carriage has reached the bottom limitation of its movement capability, it returns upwardly and rinses the vehicle's rear vertical surface, and continues to sweep with the rotary brush, which reverses direction of rotation to maintain maximum bristle friction.

At the completion of the rear vertical surface washing cycle, the driver is given an indication to continue forward within the washing system, and the horizontal carriage moves backwards and away from the vehicle to its rest position, where it awaits completion of the vehicle's washing cycle and the entry of another vehicle to be washed. Advantageously, the present invention effectively cleans the vertical rear surface or door of the vehicle without regard to the distance of the door from the cleaning apparatus, provided that the rear door has come to rest within the frame. Moreover, the reversal of direction of brush rotation allows cleaning of the top and bottom of rear door jams and ledges.

The system of the present invention further includes control means for activating washing solution pumps, controlling side brushes for cleaning the sides of the vehicle, providing a signal to the driver to stop when the rear of the trailer or van is positioned within the operating limits of the horizontal carriage, initiating the horizontal carriage forward motion, halting the horizontal carriage at such time as the horizontal carriage is positioned adjacent the rear vertical surface, initiating the rear door washing function by causing the rotary brush to begin its vertical descent and sweeping function, activating and terminating the appropriate rear door washing pumps and rinse valves, returning the vertical carriage and rotary brush vertically upward, returning the horizontal carriage to the initial position, and allowing the remaining functions of the washing system to complete by activating rinse valves to provide rinse sprays over the entire vehicle.

Safety interlocks are provided which prevent or terminate the rear surface washing cycle if the vertical carriage has experienced a malfunction which might result in a collision between the trailer and the vertical carriage. The rear surface washing cycle is also terminated if the vertical carriage encounters an object while descending, such as an extended loading ledge or the top of the trailer. Additionally, should the vehicle roll backwards into the system, a safety switch is activated which causes the horizontal carriage to move backwards and away from the vehicle.

Accordingly, it is an object of the present invention to provide an improved apparatus and method for cleaning the vertical rear surface of a vehicle.

It is another object of the present invention to provide a vehicle vertical rear surface cleaning system which is automatically adjustable to vehicles having different lengths.

It is another object of the present invention to provide a vehicle vertical rear surface washing system which effectively cleans the vertical rear surfaces of vans and trailers without regard to the position of the surface to be cleaned within the system.

It is another object of the present invention to provide a vehicle vertical rear surface washing system which effectively cleans different configurations of doors, loading ledges, and jams commonly found on the rear of vehicles.

It is another object of the present invention to provide a vehicle vertical rear surface washing system which automatically positions a vertical rear surface cleaning brush adjacent the vertical rear surface of a vehicle so as to insure proper brush pressure and penetration.

It is another object of the present invention to provide a vehicle vertical rear surface washing system which maintains constant frictional brush bristle pressure against a surface to be cleaned.

It is another object of the present invention to provide a vehicle vertical rear surface washing system which prevents the initiation of the vertical rear surface washing cycle if a malfunction in the vertical carriage movement mechanism has allowed the vertical carriage to descend to a level which prevents passage of the vehicle safely underneath the vertical carriage.

It is another object of the present invention to provide a vehicle vertical rear surface washing system which terminates the vertical rear surface washing cycle and retracts the system if the vertically-moving carriage of the system encounters the top or a rearwardly extending ledge of a vehicle to be washed, or if the vehicle moves backwardly into the system.

BRIEF DESCRIPTION OF THE DRAWING

FIG. 1 is a side view of a preferred embodiment of a vehicle vertical rear surface washing system made in accordance with the present invention.

FIG. 2 is a side perspective view of the embodiment shown in FIG. 1, showing the location of limit switches used to provide control signals.

FIG. 3 is a partial perspective view of the vertical carriage drive mechanism and rotary brush employed in the preferred embodiment of the present invention.

FIG. 4 is a detailed partial perspective view of the vertical carriage drive mechanism and rotary brush of FIG. 3.

DETAILED DESCRIPTION OF THE PREFERRED EMBODIMENT

Figure 5A:
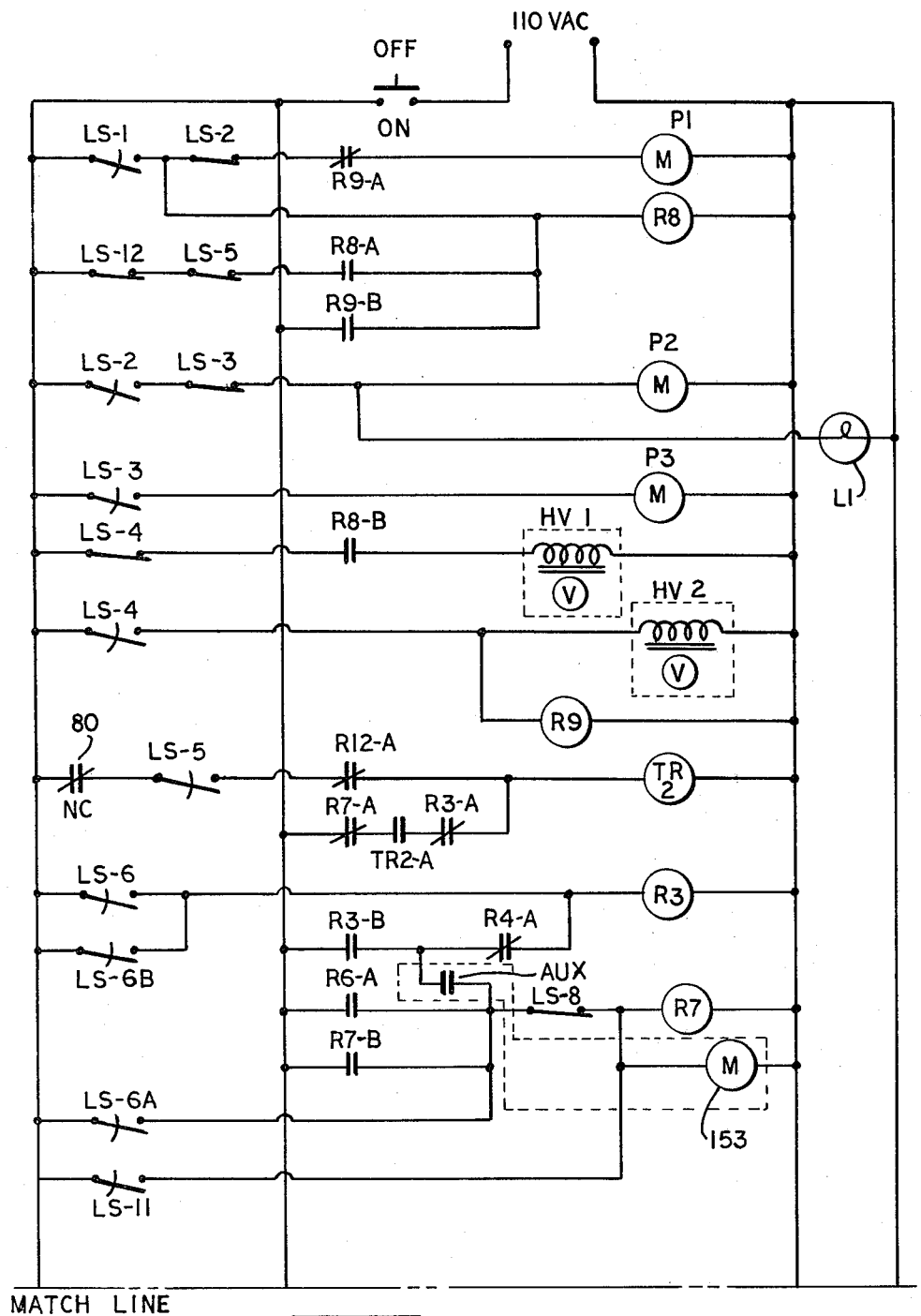
FIGS. 5A and 5B are schematic diagrams of a relay control circuit for the vertical rear surface washing system of the preferred embodiment.

Referring now in more detail to the drawings, in which like numerals indicate like parts throughout the several views, FIG. 1 shows the side view of a vehicle vertical rear surface washing system 10 constructed in accordance with the present invention. The system comprises a frame 11 which includes a stationary elongated inverted U-shaped side frame 12 (FIG. 1) having entrance vertical support post 13 positioned at the entrance 22 of the system, and exit vertical support post 14 positioned at the exit 23 to the system. The vertical support posts are joined at the top by a top horizontal beam 15 and at the bottom end by bottom horizontal beam 16. As illustrated in FIG. 3, a similar inverted U-shaped side frame 12' (not visible in the side view of FIG. 1) is placed parallel to side frame 12 at a distance sufficient to allow the passage of a vehicle between the two side frames.

Suspended within side frame 12 is a rotary vertical side brush, visible in FIG. 1 at 20, it being understood that a similar rotary vertical side brush 20' (FIG. 2) is suspended from side frame 12' opposite and parallel to brush 20 so as to allow the passage of a vehicle therebetween. Brush 20 rotates about axle 24, which is vertically disposed within side frame 12. Rotary vertical side brush 20 is powered by a side brush motor 21, which is mounted to the top of the frame.

Also suspended within side frame 12 is a horizontal carriage 30 adapted to move horizontally from a point within the frame adjacent the rotary vertical side brushes to a point adjacent the exit vertical support post 14 near the exit 23. The horizontal carriage is powered by an electric motor 31, mounted to the top of the carriage, which drives a reduction gear box 32. The reduction gear box drives a sprocket 33, which in conjunction with idler sprockets 34 and 35 pulls horizontal carriage 30 along chain 36. Chain 36 is fastened at one end to side frame 12 at the same end as entrance vertical support post 13, and at the other end to the frame at the same end as exit vertical support post 14. Electric motor 31, reduction gear box 32, and sprocket 33 therefore "walk" the horizontal carriage along the chain in order to transport the horizontal carriage within the frame, and thus provide means for moving the horizontal carriage.

Horizontal carriage 30 rests and rolls upon top horizontal beam 15 through upper guide wheels 40, 41. A pair of lower guide wheels 42, 43 also hold the carriage to the top horizontal beam and provide tracking for the carriage along the beam. A transverse horizontal mounting member, shown at 140 in FIG. 3, connects horizontal carriage 30 to a similar horizontal carriage 30' suspended from side frame 12'. Guide wheels such as those shown at 41' and 43' track horizontal carriage 30' along top horizontal beam 15'.

A transverse drive shaft, visible at 141 in FIG. 3, coaxial with sprocket 33 (FIG. 1) transmits power from reduction gear box 32 to a separate sprocket and pair of idler sprockets which drive horizontal carriage 30' along the parallel inverted U-shaped side frame 12' by "walking" a separate chain, also fastened at each end, on that frame. It will be appreciated that by controlling the direction of rotation of electric motor 31 the forward and backward movement of carriage 30 along frame 11 may be controlled. It will also be appreciated that by transmitting the power of motor 31 through drive shaft 141 to sprockets and chains associated with side frame 12', horizontal carriage 30' is aligned with and maintained parallel to horizontal carriage 30, and binding or skewing between the horizontal carriages is prevented.

Referring again to FIG. 1, attached to horizontal carriage 30 on the side nearest exit vertical support post 14 is a limit switch LS-11. Cam stop 50 is affixed to exit vertical support post 14 so that when horizontal carriage 30 has advanced horizontally towards the exit 23 of the system, LS-11 will be actuated by contacting with cam stop 50. The actuation of LS-11 provides a signal to the control circuit (discussed in greater detail below) that the limit of movement of the horizontal carriages within the frame has been reached. Limit switch LS-8 is affixed to horizontal carriage 30 nearest the entrance 22. Cam stop 51 is firmly affixed to top horizontal beam 15 so that when horizontal carriage 30 has returned to the position closest to the entrance of the apparatus, LS-8 will be actuated by contacting with cam stop 51, and will thereby provide a signal to the control circuit to halt the motion of the horizontal carriages.

Suspended within horizontal carriage 30 is vertical carriage 60, which is adapted to be moved vertically downwardly and upwardly to wash and sweep the rear surface of a vehicle 54 which has stopped so that the vertical rear surface or door 55 is positioned between entrance 22 and exit 23 but beyond vertical rotary side brush 20. The vertical carriage comprises an elongate rotary brush 61 which extends transversely between side frame 12 and the parallel side frame 12' (see FIG. 2). Hydraulic motor 62 moves the vertical carriage upwardly and downwardly and rotates brush 61. The mechanism for raising and lowering vertical carriage 60 and rotating rotary brush 61 will be discussed in greater detail in connection with FIGS. 3 and 4 below. Guide rail 63 is suspended vertically from horizontal carriage 3 and is affixed at its top end and bottom end to horizontal carriage 30. Upper guide wheels 64, 65 and lower guide wheels 66, 67 guide vertical carriage 60 along guide rail 63 when the vertical carriage is raised and lowered.

Vertical carriage 60 has affixed thereto a number of limit switches and safety valves which provide control signals to the control circuit and shut off the flow of hydraulic fluid when the vertical carriage has reached certain positions within horizontal carriage 30. Limit switch LS-7 is affixed to the top of vertical carriage 60 and provides a control signal when the vertical carriage is at the topmost position within the horizontal carriage; the departure of the vertical carriage from this topmost position results in the deactuation of this switch. Cam stop 70 is affixed to horizontal carriage 30 in a position to actuate LS-7 when the vertical carriage has reached the topmost position. Hydraulic safety valve 73, located adjacent to LS-7, shuts off the flow of hydraulic fluid to hydraulic motor 62 when the carriage is in the topmost position and thereby provides a measure of protection if limit switch LS-7 fails.

Limit switch LS-6 is affixed to the bottom of vertical carriage 60 and provides a control signal when the vertical carriage has descended to its bottommost position within the horizontal carriage. Cam stop 71 is affixed to horizontal carriage 30 in a position so as to actuate LS-6 when the vertical carriage has descended to the lowermost position within the horizontal carriage. Hydraulic safety valve 74, located adjacent to LS-6, shuts off the flow of hydraulic fluid to hydraulic motor 62 when the carriage is in the lowermost position and thereby provides a measure of protection if limit switch LS-6 fails.

Limit switch LS-6A is mounted to the bottom of vertical carriage 60 towards the exit 23, preferably with a wobble arm capable of actuating the switch in two dimensions. The wobble arm is preferably about 12-15 inches long and is disposed horizontally toward the vehicle. In the vertical dimension, LS-6A if actuated provides an indication that the vertical carriages and brush have descended inappropriately due to malfunction and are about to collide with the top of the vehicle, or that the vertical carriages and brush in normal operation are about to collide with the vehicle's top or an object such as the ledge, shown at 72 in FIG. 1, affixed to the vehicle's rear. In the horizontal dimension, LS-6A if actuated provides an indication that the vehicle is rolling backwards and is about to collide with the system. In the preferred embodiment, the actuation of LS-6A results in a two-dimensional retraction of the vehicle rear surface washing system: upwardly for the vertical carriages and brush to avoid collision with the top of a vehicle or an object, and backwardly for the horizontal carriages to avoid collision with the rear of a vehicle. It will thus be appreciated that the actuation of LS-6A results in a "safety return" retraction of the system to prevent damage.

Limit switch LS-6B is mounted to the bottom of vertical carriage 60' towards the exit 23 and provides a control function similar to LS-6. LS-6B is located slightly lower than LS-6A and slightly nearer the rear of the vehicle. Rather than having a wobble actuating arm, LS-6B preferably has a vertically actuated arm about 12-15 inches in length, disposed horizontally towards the vehicle. Limit switch LS-6B is placed to be actuated if the vertical carriages and brush are about to descend upon and collide with the top of a vehicle or an object such as a ledge, and in the preferred embodiment results in the cessation of downward movement of the vertical carriages and the initiation of upward movement in order to avoid a collision between the vertical carriage assembly and an object. It will be appreciated that LS-6B in normal operation will be actuated prior to LS-6A in the event of an inappropriate descent, and thus is the primary means for preventing undesirable vertical collisions between the system and rear loading ledges or the like.

FIG. 2 is a side perspective view of a vehicle washing system which employs the vertical rear surface washing system of the present invention. The details of the washing system have been omitted in FIG. 2 so that the location of the limit switches and sensors which are used to provide control signals to the control circuit for the washing system may be seen. It will be appreciated that conventional vehicle washing systems may advantageously employ the vertical rear surface washing system of the present invention. The locations of the limit switches shown in FIG. 2 and the control circuit discussed in greater detail in connection with FIG. 5 below are representative of a typical application of the vertical rear surface washing system of the present invention in a conventional vehicle washing system, and it will be appreciated that other configurations of limit switches, sensor locations, and wash/rinse stations may be successfully employed in connection with the vertical rear surface washing system disclosed herein.

Turning now to FIG. 2, the limit switch and sensor locations for a typical vehicle washing system may be seen. The system in FIG. 2 comprises the vehicle rear surface washing system 10 constructed in accordance with the present invention. Limit switches LS-1, LS-2, and LS-3 are positioned at the entrance 22 of the washing system so as to provide appropriate control signals when a vehicle enters the system. LS-1 is located at a suitable elevation above the pavement level so as to be actuated by contact with the tractor of a vehicle to be washed. Limit switches LS-2 and LS-3 are positioned on the frame 11 with horizontally disposed actuating arms at a suitable elevation so as to be actuated by the trailer portion of a vehicle. Limit switch LS-4 is placed within the frame at a position adjacent the side brush 20, and has a downwardly disposed arm which is actuated by the passage of the trailer of the vehicle.

Limit switch LS-8 is affixed to horizontal carriage 30 so that it is actuated by cam stop 51 when the horizontal carriage is in the rest position adjacent the side brush 20. Limit switch LS-11 is also positioned on horizontal carriage 30 and is placed in a position to be actuated by contact with cam stop 50 when the horizontal carriage has advanced to the limits of its movement near the exit 23 of the system. In normal operation, horizontal carriage 30 positions itself adjacent the rear surface 55 of the vehicle 54 being washed; LS-11 should actuate only if the horizontal carriage does not come to rest adjacent the rear surface of the vehicle but instead reaches the extent of its movement capability and should therefore return to its rest position.

Limit switch LS-7, discussed in connection with FIG. 1, is mounted to the topmost portion of the vertical carriage 60 so as to be actuated when the vertical carriage is in the topmost position. LS-7 is placed so that it actuates when the vertical carriage is at the uppermost limit of its movement capability within the horizontal carriage 30, and deactuates when the vertical carriage 60 descends from the uppermost position. Limit switch LS-6 is placed on the bottom of vertical carriage assembly 60 so as to be actuated against cam stop 71 when the vertical carriage has reached the bottommost extent of its movement capability within horizontal carriage 30. LS-6 provides an indication that the vertical carriage has descended to the bottom of its travel and should therefore return upwards vertically to its rest position at the topmost position within the horizontal carriage.

Infrared light source 81 is affixed to the upper portion of horizontal carriage 30 so that the light beam is directed diagonally downward and transverse to the direction of travel of a vehicle through the system. Electric eye 80, an infrared light detector, is affixed to the lower portion of horizontal carriage 30' opposite light source 81 and in the path of the light beam emitted thereby. The light beam and detector in the preferred embodiment are infrared to allow daylight operation of the system. The light beam is directed transversely and diagonally downward so that the light beam will most likely be broken when any part of a vehicle is positioned between the light source and detector. The diagonal light beam advantageously insures that improper actuation of the electric eye 80 will not occur if the tractor portion of a vehicle possesses an unusual configuration which might allow the light beam to strike the detector before the trailer can block the beam, or if the trailer portion of a vehicle is a cattle trailer or the like having slotted sides which might allow the light beam to strike the detector before the end of the trailer has passed beyond the beam.

In normal operation, the light beam is broken by the passage of the trailer between the light source 81 and the electric eye 80, and the light beam strikes the electric eye 80 at such time as the vehicle's rear surface passes beyond the beam. The re-establishment of the light beam provides a control signal to the control circuit for the vertical rear surface washing system which, in conjunction with the actuation of other limit switches in the appropriate sequence, discussed below, will initiate the forward travel of the horizontal carriage 30 towards the vertical surface of the vehicle to be washed. When the electric eye is broken again by the vertical rear surface, the control signal provides an indication to the control apparatus that the horizontal carriage has reached a position adjacent the rear vertical surface and should be stopped so as to allow the vertical rear surface washing system to perform its function. Techniques for employing electric eye light beam interruption and re-establishment and control signals resultant therefrom are well known in the art and will not be discussed in detail herein.

Limit switch LS-12 is positioned near the exit 23 at a suitable elevation above the pavement so as to be actuated by the passage of the tractor portion of a vehicle. Limit switch LS-5 is positioned also at the exit but at an elevation so as to be actuated upon contact with the trailer portion of the vehicle.

Rinse station 90 is positioned a distance from the exit 23 of the washing system and contains limit switches LS-9 and LS-10 for actuating the rinse at such time as the tractor and trailer, respectively, enter the rinse station. Techniques for rinsing vehicles after washing are also known in the art and will not be discussed further herein. Signal lamps L1 and L2 are affixed to the rinse station in a position visible to a driver emerging from exit 23, and provide signals that the trailer nose is being washed, and that the driver should stop, respectively.

FIG. 3 is a partial perspective view illustrating the rotary brush, horizontal carriage assembly, and vertical carriage assembly employed in the preferred embodiment. The complete vertical carriage assembly comprises a vertical carriage 60 which is associated with side frame 12, a substantially similar vertical carriage 60' which is associated with side frame 12', a rotary brush 61, and spray manifolds 131 and 132.

As discussed above, the rotary brush 61 is adapted to be moved vertically for washing the vertical rear surface of a vehicle after the horizontal carriage assembly which transports the vertical carriage assembly has come to rest adjacent the vertical surface to be washed. The rotary brush is mounted by axle 100 horizontally transverse to the direction of travel of the vehicle. At one end of the axle is mounted a pair of sprockets 101, 102 which receive power from hydraulic motor 62 and transmit power to the means for raising and lowering the vertical carriage assembly, respectively. Hydraulic motor 62 is suitably mounted within the vertical carriage assembly so that power might be transmitted through motor sprocket 103 and drive chain 104 to sprocket 101 mounted on the axle.

A countershaft 110 is mounted parallel to axle 100 on the vertical carriage 60 and has a countersprocket 112 adapted to receive power from sprocket 102 by way of countershaft chain 113. Also mounted to the countershaft is a vertical drive sprocket 120. Idler sprockets 121, 122 are mounted to the vertical carriage with axes parallel to the countershaft. Vertical drive chain 123 is firmly affixed at one end to the top of horizontal carriage 30, at the other end to the bottom of the horizontal carriage, and is intermeshed with idler sprocket 121, vertical drive sprocket 120, and idler sprocket 122 so that the rotation of countershaft 110 will cause the entire vertical carriage to "walk" along vertical drive chain 123 as the vertical carriage ascends or descends. It will thus be appreciated that hydraulic motor 62 provides means for rotation of the rotary brush 61 and provides means for raising and lowering the vertical carriage.

The end of axle 100 opposite the end which receives power from the hydraulic motor contains a sprocket 102' which drives drive chain 104' and countersprocket 112' in a fashion similar to that described in the preceding paragraph. Countersprocket 112' is affixed to one end of countershaft 110' and vertical drive sprocket 120' is affixed to the other end in a fashion similar to that described above. It will thus be appreciated that the power of hydraulic motor 62 is also transmitted through axle 100 to sprockets and chains which assist in raising and lowering the vertical carriage assembly.

It may be noted in FIG. 3 when viewed from vertical carriage 60 that the counterclockwise rotation of rotary brush 61 accompanies the lowering of the vertical carriage assembly so that the brush bristles in contact with the surface being cleaned are brushing downwardly, in the same the direction of vertical carriage movement. It may also be noted that the clockwise rotation of the rotary brush accompanies the raising of the vertical carriage assembly so that the brush bristles maintain a direction of brushing which is the same as the direction of vertical carriage movement. Consequently, the rotary brush reverses its direction of rotation when the vertical carriage ceases downward movement and begins to move upwardly, thereby always providing maximum friction between the brush bristles and the surface being cleaned.

A mounting plate 130' associated with vertical carriage 60' contains appropriate bearings for axle 100 and countershaft 110', and provides a surface to which the components of the vertical carriage may be mounted. It will be appreciated that a mounting plate 130 substantially similar to that shown at 130' may be used to mount hydraulic motor 62 and the appropriate bearings for axle 100, countershaft 110, and idler sprockets 121 and 122. Mounting plate 130 may be seen in FIG. 4. Still referring to FIG. 3, upper guide wheel 64' and lower guide wheel 66' are mounted to mounting plate 130' through appropriate axle means so as to guide the vertical carriage assembly upwardly and downwardly along vertical guide rail 63'.

Also affixed to mounting plate 130' is a wash solution manifold 131 and a rinsing solution manifold 132 which may be attached by means of flexible piping 133 to appropriate means for pumping detergent solution and water upon the surface to be cleaned. Inasmuch as means for providing washing and rinsing solution are well known in the art, further discussion will not be included herein. It will however be appreciated that mounting plate 130 and the various components attached thereto, together with mounting plate 130', comprise the complete vertical carriage assembly which can be raised and lowered to wash the rear vertical surface in accordance with the present invention.

FIG. 3 also shows the preferred placement of components comprising the horizontal carriage assembly of the vehicle rear surface washing system disclosed herein. The complete horizontal carriage assembly comprises a horizontal carriage 30 associated with side frame 12 and a substantially similar horizontal carriage 30' associated with side frame 12', connected by transverse horizontal mounting member 140.

Electric motor 31 and reduction gear box 32 are mounted by suitable means to an appropriate mounting surface such as horizontal mounting member 140 which extends transversely across the frame and connects the two horizontal carriages, 30 and 30', comprising the complete horizontal carriage assembly. The power from the electric motor is transmitted through reduction gear box 32 to a drive shaft 141 which extends transversely between side frame 12 and side frame 12'. Power is thus transmitted through sprockets 33 and 33' to horizontal drive chains 36 and 36' which are kept aligned with the drive sprockets by means of idler sprockets 34, 34', 35, and 35'. It will be appreciated that the use of drive sprockets at the ends of drive shaft 141 together with idler sprockets engaged with fixed drive chains provides means for moving the horizontal carriages 30 and 30' forwards and backwards along top horizontal beams 15 and 15' without binding or skewing under the influence of electric motor 31.

Upper guide wheels 40, 41 and lower guide wheels 42, 43 guide the horizontal carriage 30 along top horizontal beams 15. It will be appreciated that a set of upper guide wheels and lower guide wheels are also employed at the opposite end of transverse horizontal mounting member 140 to guide and support the horizontal carriage 30' along top horizontal beam 15'.

A final component of the horizontal carriage is infrared electric eye 80, which is affixed to horizontal carriage 30' at an elevation to insure the detection of the infrared light beam emitted transversely and diagonally downwardly by infrared light source 81. Those skilled in the art will appreciate that other means could be employed for detecting the passage of a trailer and the rear vertical surface thereof and providing an appropriate control signal to the control means of the washing system.

FIG. 4 is a partial perspective view of the vertical carriage 60 showing the details of attachment to mounting plate 130. Hydraulic motor 62 is shown mounted to one side of the mounting plate. Motor sprocket 103 drives sprocket 101 by means of motor drive chain 104. Sprocket 101 and sprocket 102 are fixed to axle 100 of rotary brush 61. Sprocket 102 drives countersprocket 112 through countershaft chain 113. Countersprocket 112 is mounted at one end of countershaft 110, at the other end of which is mounted vertical drive sprocket 120. Vertical drive chain 123 is engaged with idler sprockets 121 and 122 which are rotatably mounted to mounting plate 130.

As the vertical carriage 60 ascends and descends the vertical drive chain 123, it is guided along guide rail 63 by upper guide wheels 64, 65 and lower guide wheels 66, 67 which are rotatably mounted to mounting plate 130. Manifold support 150 is also affixed to mounting plate 130 by suitable support means. Washing solution manifold 131 and rinsing manifold 132 are affixed to manifold support 150 so that they extend transversely across the surface of the vehicle to be washed parallel to brush 61.

Figure 5B:
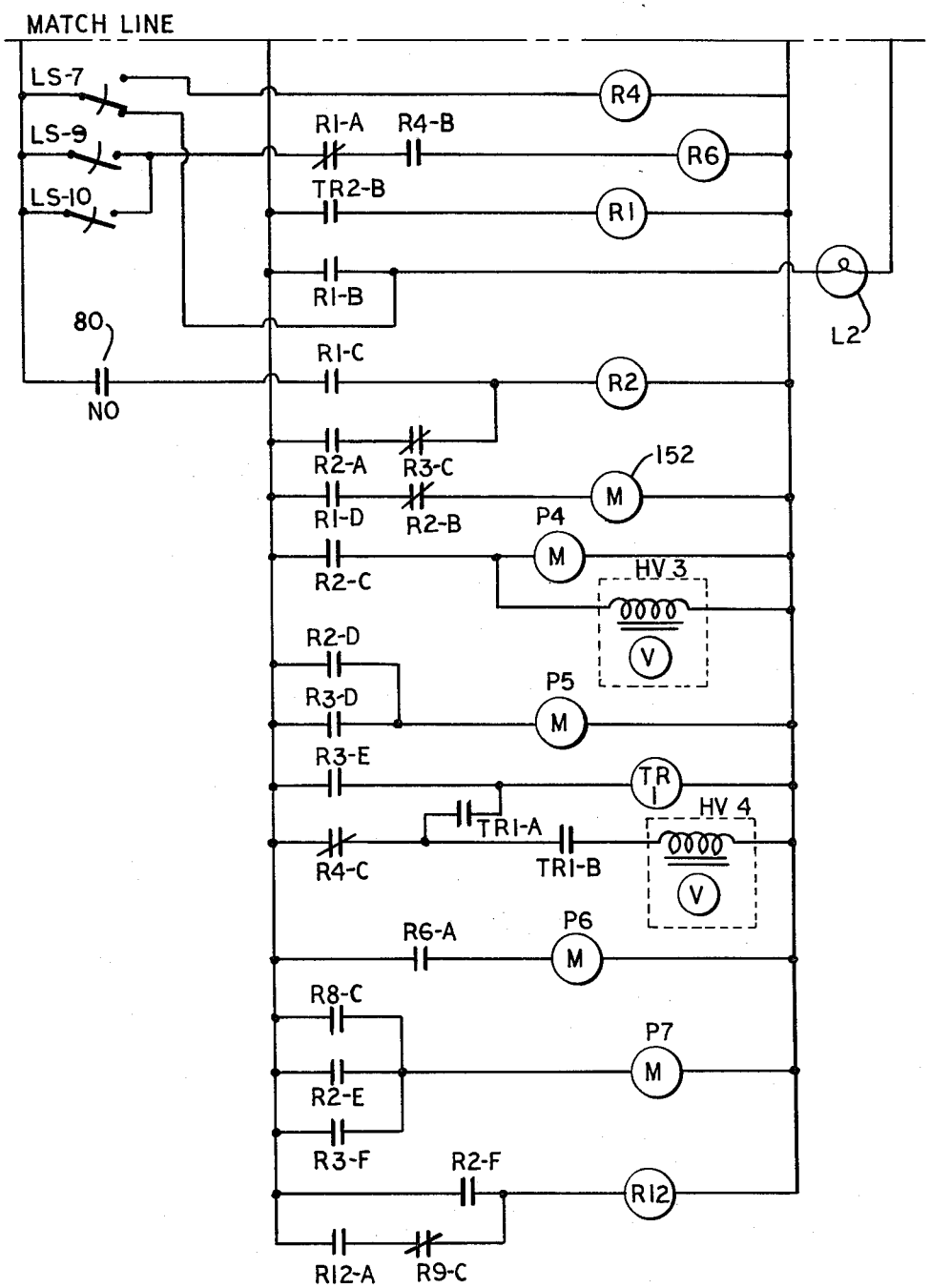

FIGS. 5A and 5B are schematic diagrams of a relay control circuit which provides appropriate control signals to actuate the forward and reverse motion of the horizontal carriage assembly, the upwards and downwards motion of the vertical carriage assembly, and the other functions associated with the preferred embodiment of the present invention. For purposes of discussion, relay contacts will be referred to as Rn-X, where n is a number which represents the number of the relay referred to, and X is an alphabetical letter which represents the particular contacts of the relay being discussed. It will be understood that conventional notation for relay contacts is employed in FIG. 5, so that normally closed contacts will open upon actuation of the relay, and normally open contacts shall close upon actuation of the relay. It will also be understood that conventional notation is used for indicating the closure of limit switches which are indicated with a notation LS-n, where n represents the numerical designation of the limit switch being discussed. Conventional notation for normally open and normally closed contacts of limit switches is also employed.

The sequence of operation of the preferred embodiment of the vehicle rear surface washing system constructed in accordance with the present invention is initiated by actuating LS-1. The tractor of a vehicle to be washed will actuate LS-1 which through the normally-closed contacts of LS-2 and R9-A activates tractor wash pump P1 and trips relay R8. Tractor wash pump P1 causes wash solution to be sprayed upon the tractor as it enters the washing system. Relay R8 is held in the latched position through contacts R8-A and the normally-closed contacts of limit switches LS-12 and LS-5. The tripping of relay R8 through contacts R8-B actuates hydraulic solenoid valve HV1 which allows hydraulic fluid to be channeled to a hydraulic motor which turns the side brushes, one of which is shown at 20 in FIG. 2. HV1 in the preferred embodiment is a valve which provides power to rotate side brush 20 at a slow speed to prevent damage to the antennae, rear view mirrors and other external appendages of the tractor. Relay contacts R8-C are also closed by the actuation of relay R8 and turn on pump P7, which is a conventional hydraulic pump used to provide hydraulic power to the system.

As the vehicle advances into the washing apparatus behond LS-1, the trailer portion of the vehicle will actuate limit switch LS-2. The normally-closed contacts of LS-2 then will open and turn off tractor wash pump P1. The normally-open contacts of LS-2 when closed by the trailer, through the normally-closed contacts of LS-3 actuate nose wash pump P2, which provides washing solution to the nose portion of the trailer. Additionally, nose light L1 will be illuminated by the actuation of LS-2. For proper washing in the preferred embodiment, the driver should be instructed to pause momentarily upon observing that the nose light L1 has illuminated, to allow time for the front end of the trailer to be washed. The driver should continue through the washing system after pausing momentarily for the nose wash. At such time as the trailer moves further forward into the system, it will actuate limit switch LS-3. The normally-closed contacts of LS-3 will open and turn off nose wash pump P2 and nose light L1. The normally-opened contacts of LS-3 will close and turn on trailer side wash pump P3, which causes washing solution to be sprayed upon the sides of the trailer.

As the vehicle continues through the washing system, the next switch to be encountered by the trailer is limit switch LS-4, which is suspended between side brushes 20 and 20'. When LS-4 is actuated, the normally-closed contacts will open and remove power from hydraulic solenoid valve HV1, the valve which provides hydraulic power to rotate side brushes at a slow speed. The closing of the normally-open contacts of LS-4 will actuate hydraulic solenoid valve HV2 which causes the side brushes to rotate at a faster speed for sweeping the sides of the trailer. Additionally, relay R9 will be tripped, which will hold relay R8 in the actuated position through contacts R9-B for the functions which follow.

As the driver proceeds through the washing system, the sides of the trailer will be washed and swept by the side brushes. At such time as the tractor actuates limit switch LS-12, located at the exit of the rear surface washing system, power will be removed from relay R8 as the normally-closed contacts of LS-12 are opened, but relay R8 will be held actuated by contacts R9-B, as indicated above.

Limit switch LS-5 will be actuated by the trailer of the vehicle as it emerges from the exit of the system. The normally-open contacts of LS-5 will close and will provide power through the normally-closed contacts of electric eye 80 and normally-closed contacts R12-A to timing relay TR2 which initiates the horizontal carriage and vertical carriage movement sequence. It is noted that when limit switch LS-5 is actuated by the trailer, the light beam of electric eye 80 should be interrupted by the presence of the trailer so that electricity will not pass through the normally-closed contacts. It is further noted that no functions which depend upon electric eye 80 can occur unless and until LS-5 is actuated. LS-5 thus precludes motion of the carriages if the trailer is not holding LS-5 actuated and thereby provides a safety function.

At such time as the end of the trailer passes beyond electric eye 80 and allows detection of the light beam, electricity will pass through the normally-closed contacts, and if LS-5 is actuated, timing relay TR2 then actuates. After a delay to allow the trailer to pass slightly beyond the rear surface washing system, the contacts of TR2 close. TR2, once actuated, will be held on through normally-closed contacts R7-A, TR2-A, and normally-closed contacts R3-A. Timing relay TR2 also trips relay R1 through contacts TR2-B. Contacts R1-B then provide power to rear door light L2, which provides a signal to the driver to halt his vehicle so that the rear door can be washed.

With relay R1 tripped and held in the tripped position by contacts TR2-B of timing relay TR2, power is provided through contacts R1-D and normally-closed contacts R2-B to carriage forward motor contactor 152, which initiates the forward motion of the horizontal carriage. Carriage forward motor contactor 152 is a conventional relay actuated motor contactor which connects three phase electric power to a three phase electric motor so as to induce rotation in a given direction. Electric motor 31 in the preferred embodiment is a conventional three phase electric motor which will rotate in the direction which causes the horizontal carriage assembly to move forward toward the rear surface of the vehicle when carriage forward motor contactor 152 is actuated.

At this point in the sequence of operation of the preferred embodiment, the horizontal carriage is moving toward the rear vertical surface to be washed. At such time as the light beam for the electric eye 80 is broken by the end of the trailer, relay R2 will be tripped through contacts R1-C. R2 is held latched by contacts R2-A and normally-closed contacts R3-C. Normally closed contacts R2-B open with the tripping of R2 and remove power from electric motor 31 by deactuating carriage forward motor contactor 152, so that the horizontal carriage comes to rest adjacent the rear of the trailer. Contacts R2-C close with the tripping of R2 and turn on pump P4, which sprays washing solution to the rear door through the rear door washing solution manifold such as that shown at 131 in FIGS. 3 and 4. Contacts R2-C also actuate hydraulic solenoid valve HV3, which allows hydraulic fluid to move hydraulic motor 62 in a direction which allows the vertical carriage to begin its descent. It will be appreciated that the actuation of hydraulic valve HV3 and the provision of power to hydraulic motor 62 simultaneously rotates rotary brush 61 and moves the vertical carriage downwardly. It will also be appreciated that the position of the horizontal carriage adjacent to the vertical surface allows proper brush penetration of the rear door so as to insure adequate cleaning action by the bristles of the rotary brush 61.

Several other functions follow from the actuation of relay R2. Contacts R2-D provide power to pump P5 which allows rinse water to be pumped through rinse manifold 132. It will be appreciated that the descent of the rotary brush is preceded by a rinse spray which both precleans the rear surface and wets the surface so that the brush bristles do not experience undue wear because of brushing against a dry surface. Contacts R2-E insure that power remains provided to hydraulic pump P7. Contacts R2-F energize relay R12, which is held latched by contacts R12-A and normally-closed contacts R9-C. The tripping of relay R12 causes the opening of contacts R12-A, which insures that timing relay TR2 will not trip at an inappropriate point in the sequence.

Digressing for a moment from the normal sequence of operation of the preferred embodiment, a pertinent safety feature will now be discussed. Limit switch LS-7, as indicated in the discussion above, is placed at the top of the vertical carriage so that when the vertical carriage is in its topmost position, LS-7 will be actuated. In the event that the vertical carriage has crept downward because of faults in the hydraulic system, LS-7 will allow rear door light L2 to illuminate, and will provide a warning to a driver that he should refrain from using the system because the vertical carriage has descended away from its uppermost position. Thus, it will be appreciated that LS-7 may cause the illumination of the rear door light at a time prior to its proper illumination through relay contacts R1-B and thus provides a safety signal to prevent use of the system if a malfunction in the hydraulic system has allowed the vertical carriage to creep downward.

Returning now to the normal operation of the vertical carriage, reference is now made to limit switch LS-6, which is actuated when the vertical carriage reaches its lowermost position. The actuation of LS-6 trips relay R3. Limit switch LS-6B, which actuates upon contact with a loading ledge or the like, also trips R3. R3 is held tripped by contacts R3-B and normally-closed contacts R4-A. It is noted that contacts R4-A will be in the normally-closed position if limit switch LS-7 provides an indication that the vertical carriage has descended from its uppermost position. The tripping of R3 allows normally-closed contacts R3-A to open, thereby deactivating timing relay TR2. The deactivation of TR2 causes R1 to drop out by opening contacts TR2-B. Normally-closed contacts R3-C also open which deactivate relay R2. Contacts R3-D hold rear door rinse pump P5 on to insure that rinsing of the rear door continues. The deactuation of relay R2 causes the opening of contacts R2-C so that rear door wash pump P4 will turn off, and hydraulic solenoid valve HV3, which controls the downward motion of the vertical carriage, will close, ceasing the descent of the vertical carriage.

The tripping of relay R3, through contacts R3-E, allows timing relay TR1 to actuate. TR1, after a delay to allow the mechanical settling of the vertical carriage, then closes its contacts. Through contacts TR1-A and normally-closed contacts R4-C, timing relay TR1 will be held actuated. Also, power will be provided through contacts TR1-B to hydraulic solenoid valve HV4, which provides hydraulic fluid to hydraulic motor 62 to begin the upward motion of the vertical carriage and the reverse rotation of the rotary brush.

When the vertical carriage has returned to its topmost position, limit switch LS-7 will again be actuated. Relay R4 will be tripped; contacts R4-C will remove power from timing relay TR1 and from hydraulic solenoid valve HV4. Thus, the vertical carriage will cease its upward motion and come to rest. Moreover, the actuation of LS-7 will extinguish rear door light L2, which informs the driver that he may proceed. At this point in the sequence, the rear door washing action is completed.

After completion of the rear door washing, the driver continues forward in the washing apparatus until such time as the tractor actuates limit switch LS-9, or the trailer actuates limit switch LS-10, both contained in a conventional rinse station such as that shown at 90 in FIG. 2. Power will be provided through normally-closed contacts R1-A (relay R1 at this point has been deactuated), and contacts R4-B to relay R6. It will be observed that the contacts R4-B will be closed at this point provided that the vertical carriage assembly has achieved its topmost position and actuated LS-7, which trips relay R4. The tripping of relay R6 provides power through contacts R6-A to rinse pump P6 which allows rinsing of the entire vehicle to occur at the rinse station 90.

Relay R7 is actuated by contacts R6-A. R7 is held latched by contacts R7-B. With R7 held latched, carriage return motor contactor 153 allows three phase electric power to be provided to electric motor 31. The connection of power to the electric motor through carriage return motor contactor 153 results in the rotation of the electric motor in the direction which causes the horizontal carriage assembly to move backwards away from the rear surface of the vehicle. As in the case of carriage forward motor contactor 152, carriage return motor contactor 153 is a conventional relay actuated motor contactor which connects three phase electric power to a three phase electric motor so as to induce rotation in a given direction. Power is thus provided to electric motor 31 so as to return the horizontal carriages to the rest position.

It will also be noted that limit switch LS-11 may alternatively trip relay R7 and provide for a return of the horizontal carriage assembly. LS-11 is actuated in the event that the rear door washing sequence has not completed and the horizontal carriage assembly has traveled the limits of its capability, which results in the actuation of LS-11 by contact with cam stop 50, shown in FIG. 1. At such time as the horizontal carriage assembly has returned to its rest position, either by the tripping of relay R6 from LS-9 or LS-10, or by actuation of LS-11, limit switch LS-8 will be actuated. Power will be removed from electric motor 31 by deactuating carriage return motor contactor 153, the horizontal carriage assembly will then come to rest, and the system will be ready for another vehicle when relay R6 and rinse pump P6 are deactivated by the deactuation of LS-9 and LS-10.

It will also be noted that limit switch LS-6A, mounted on the bottom of the vertical carriage with a wobble actuating arm so as to be actuated if the vertical carriage collides with a trailer top or ledge or if the vehicle moves backwardly into the system, will trip relay R7 and initiate the carriage return sequence described above. It will be further noted that the actuation of LS-6A will trip relay R3 through auxiliary contacts AUX of carriage return motor contactor 153 (which close upon activation of the motor in the "carriage return" mode) and contacts R4-A if the vertical carriage has descended from its topmost position. As will be recalled, the tripping of relay R3 allows contacts R3-E to trip timing relay TR-1, thereby actuating hydraulic solenoid valve HV4 and causing the vertical carriage assembly to return to the upmost position. It will thus be appreciated that limit switch LS-6A causes a "safety return" of the entire rear door washing system if an undesirable actuation of safety return limit switch LS-6A switch has occurred.

It is to be understood that while a preferred embodiment of the present invention has been illustrated and described herein, other alternative configurations or modifications may occur to those skilled in the art and what is intended to be covered herein is not only the illustrated form of the invention, but also any and all modified forms thereof as may come within the scope and spirit of this invention as hereinbefore described and defined in the following claims.

We claim:

1. An apparatus for cleaning the rearwardly facing vertical surface of a vehicle, comprising:

a rotary brush movable within predetermined limits laterally towards and away from said vertical surface from behind said vehicle for brushing said vertical surface;

control means for providing a forward signal when said vertical surface is within said predetermined limits, a halt signal when said brush is adjacent said vertical surface, and a return signal when said brush has brushed said vertical surface;

first power means responsive to said forward signal, said halt signal, and said return signal for moving said brush towards said vertical surface upon receipt of said forward signal, halting said brush upon receipt of said halt signal, and moving said brush away from said vertical surface upon receipt of said return signal; and second power means for brushing said vertical surface with said brush.

2. An apparatus for cleaning the rearwardly facing vertical surface of a vehicle, comprising:

a frame superjacent said vehicle;

carriage means movably suspended from said frame horizontally positionable within said frame adjacent said vertical surface;

vehicle sensing means for providing a carriage forward signal when said vertical surface is positioned within said frame;

vehicle end sensing means for providing a carriage stop signal when said carriage is positioned within said frame adjacent said vertical surface;

motor means responsive to said carriage forward signal and said carriage stop signal for moving said carriage within said frame towards said vertical surface upon said carriage forward signal, and for halting said carriage means adjacent said vertical surface upon said carriage stop signal; and brush means responsive to said stop signal affixed to said carriage means for sweeping said vertical surface upon said carriage stop signal.

3. An apparatus for cleaning the rearwardly facing vertical surface of a vehicle, comprising:

horizontal carriage means positionable within predetermined limits adjacent to said vertical surface;

first motor means for moving said horizontal carriage means towards and away from said vertical surface;

vertical carriage means suspended from said horizontal carriage means and vertically movable within said horizontal carriage means adjacent to said vertical surface;

rotary brush means carried by said vertical carriage means for brushing said vertical surface as said vertical carriage means moves adjacent to said vertical surface;

second motor means for moving said vertical carriage means vertically within said horizontal carriage adjacent to said vertical surface;

rotary brush motor means for rotating said rotary brush means;

sensing means for detecting said vertical surface within said predetermined limits; and control means responsive to said sensing means for actuating said first motor means to move and position said horizontal carriage means adjacent said vertical surface, actuating said rotary brush motor means to rotate said rotary brush means and brush said vertical surface, and actuating said second motor means to move said vertical carriage means and said rotary brush means vertically within said horizontal carriage means adjacent to said vertical surface.

4. An apparatus for cleaning the rearwardly facing vertical surface of a vehicle, comprising:
a frame superjacent said vehicle;
carriage means movably suspended from said frame, capable of assuming a rest position and horizontally positionable within said frame away from said rest position adjacent said vertical surface;
elongate rotary brush means rotatable about a horizontal axis and suspended from said carriage means transverse to said vertical surface, said brush means being capable of assuming a rest position and vertically movable within said carriage means to brush said vertical surface;
detection means for providing a go signal when said vertical surface is detected by said detection means within said frame and a stop signal when said carriage means and said brush means are detected by said detection means adjacent said vertical surface;
signal means for providing a return signal when said vertical surface has been brushed by said brush means;
horizontal locomotion means responsive to said go signal, said stop signal and said return signal, for retractably moving said carriage means within said frame away from said rest position towards said vertical surface upon receipt of said go signal, halting said carriage means upon receipt of said stop signal, and returning said carriage means to said rest position upon receipt of said return signal;
vertical locomotion means responsive to said stop signal for retractably moving said brush means vertically within said carriage means adjacent said vertical surface upon receipt of said stop signal; and
rotation means responsive to said stop signal for rotating said brush means and brushing said vertical surface as said vertical locomotion means moves said brush means vertically within said carriage means adjacent said vertical surface.

5. The apparatus of claim 4 wherein said brush means brushes said vertical surface in a direction the same as the direction of vertical movement of said brush means.

6. The apparatus of claim 4 wherein said vertical locomotion means comprises hydraulic motor means.

7. The apparatus of claim 4 wherein said horizontal locomotion means comprises electric motor means.

8. The apparatus of claim 4 wherein said detection means comprises light-emitting means mounted on said carriage means for emitting a light beam transverse to the direction of travel of said vehicle; and
light-detection means mounted on said carriage in the path of said light beam opposite said light-emitting means,
whereby the entry of said vehicle within said frame interrupts said light beam, and said light-detection means provides said go signal when said light beam is detected after said vehicle interrupts said light beam and provides said stop signal when said light beam is interrupted by said rear vertical surface after said go signal.

9. The apparatus of claim 8 wherein said light beam is emitted by said light-emitting means transverse to the direction of travel of said vehicle and diagonally upwardly.

10. The apparatus of claim 8 wherein said light beam is emitted by said light-emitting means transverse to the direction of travel of said vehicle and diagonally downwardly.

11. An apparatus for cleaning the rearwardly facing vertical surface of a vehicle, comprising:
a supporting structure of greater height than said vehicle and having an entrance and an exit;
a carriage mounted on said supporting structure movable forwardly toward said vertical surface and backwardly away from said vertical surface;
brush means carried in said carriage transversely to the direction of travel of said vehicle from said entrance to said exit through said supporting structure, said brush means movable upwardly and downwardly within said carriage;
detecting means for providing a control signal in response to the detection of said vertical surface within the confines of said supporting structure;
first motor means responsive to said control signal for moving said carriage forwardly toward said vertical surface when said vertical surface is stopped within the confines of said supporting structure and stopping said carriage when said carriage is a predetermined distance from said vertical surface; and
second motor means for moving said brush means upwardly and downwardly and brushing said vertical surface when said carriage stops at said predetermined distance.

12. The apparatus of claim 11 wherein said brush brushes said vertical surface downwardly when said brush moves downwardly within said carriage.

13. The apparatus of claim 11 wherein said brush brushes said vertical surface upwardly when said brush moves upwardly within said carriage.

14. Apparatus for cleaning a vehicle, comprising:
carriage means movable towards and away from the vehicle,
first detecting means for providing a carriage forward control signal when a portion of the vehicle to be cleaned is within the range of movement of said carriage means,
motor means responsive to said carriage forward control signal for moving said carriage means towards said portion of the vehicle,
second detecting means for providing a washing cycle control signal when said carriage means is adjacent to said portion of the vehicle; and
cleaning means carried by said carriage means responsive to said washing cycle control signal for cleaning at least said portion of the vehicle.

* * * * *